US012570206B2

(12) United States Patent
Akimoto et al.

(10) Patent No.: US 12,570,206 B2
(45) Date of Patent: Mar. 10, 2026

(54) AUTOMOBILE

(71) Applicant: Nichia Corporation, Anan (JP)

(72) Inventors: Hajime Akimoto, Anan (JP); Yuta Hamazaki, Kawasaki (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 18/632,012

(22) Filed: Apr. 10, 2024

(65) Prior Publication Data

US 2024/0391377 A1    Nov. 28, 2024

(30) Foreign Application Priority Data

May 22, 2023    (JP) ................................. 2023-083724

(51) Int. Cl.
B60Q 1/08        (2006.01)
B60Q 1/00        (2006.01)
B60Q 1/50        (2006.01)

(52) U.S. Cl.
CPC .......... B60Q 1/085 (2013.01); B60Q 1/0023 (2013.01); B60Q 1/525 (2013.01); B60Q 2300/112 (2013.01); B60Q 2300/322 (2013.01); B60Q 2300/324 (2013.01); B60Q 2400/20 (2013.01); B60Q 2400/50 (2013.01)

(58) Field of Classification Search
CPC ........ B60Q 2300/112; B60Q 2300/322; B60Q 2300/324
See application file for complete search history.

(56) References Cited

U.S. PATENT DOCUMENTS

| | | | |
|---|---|---|---|
| 11,618,373 B1 * | 4/2023 | Dudar | B60Q 1/545 |
| | | | 362/549 |
| 2005/0002195 A1 | 1/2005 | Katayama et al. | |
| 2012/0075875 A1 * | 3/2012 | Son | B60Q 1/543 |
| | | | 315/77 |
| 2017/0203685 A1 * | 7/2017 | Hirai | B60Q 1/0023 |
| 2023/0137419 A1 * | 5/2023 | Sergeev | A01M 21/043 |
| | | | 362/459 |
| 2023/0145427 A1 * | 5/2023 | Ray | B60Q 1/0035 |
| | | | 315/79 |

FOREIGN PATENT DOCUMENTS

| | | |
|---|---|---|
| DE | 102010025721 A1 | 1/2012 |
| JP | H04-103442 A | 4/1992 |
| JP | H07-144577 A | 6/1995 |
| JP | H10-96694 A | 4/1998 |
| JP | H10-181424 A | 7/1998 |

(Continued)

*Primary Examiner* — Abdulmajeed Aziz
*Assistant Examiner* — Jessica M Apenteng
(74) *Attorney, Agent, or Firm* — Kim & Stewart LLP

(57) ABSTRACT

An automobile includes a vehicle, a light source, a sensor, and a controller. The light source is disposed in the vehicle and configured to emit first light toward a first region of a road surface and emit second light toward a second region that is located directly below the vehicle on the road surface and is different from the first region. The sensor is disposed in the vehicle to detect the second light regularly reflected in the second region. The controller is configured to control the light source to set at least one of an intensity or a spectrum of the first light or an image projected with the first light based on a detection result of the sensor.

20 Claims, 15 Drawing Sheets

(56) References Cited

FOREIGN PATENT DOCUMENTS

| | | | |
|---|---|---|---|
| JP | 2004-359175 | A | 12/2004 |
| JP | 2011-168225 | A | 9/2011 |
| JP | 2014-227086 | A | 12/2014 |
| JP | 2020-020709 | A | 2/2020 |
| WO | 2014/112038 | A1 | 7/2014 |

* cited by examiner

R1

R2

1

10

R1

R1

R2

R1

AUTOMOBILE

CROSS-REFERENCE TO RELATED APPLICATIONS

The present application claims priority under 35 U.S.C. § 119 to Japanese Patent Application No. 2023-083724, filed May 22, 2023, the contents of which is hereby incorporated by reference in its entirety.

BACKGROUND

1. Technical Field

An embodiment of the present invention relates to an automobile.

2. Description of Related Art

In recent years, by using a light-emitting diode (LED) as a light source of a headlight of an automobile, the headlight has been miniaturized. If the headlight is further miniaturized in the future, it is expected that it will be difficult to recognize the presence of the automobile from a position where light emitted from the headlight does not directly reach, and there is a concern that safety will be reduced. See, e.g., Japanese Patent Publication No. H7-144577.

SUMMARY

One or more embodiments of the present disclosure is directed to providing an automobile with improved safety.

An automobile according to an embodiment of the present invention includes a vehicle; a light source disposed in the vehicle and configured to emit first light toward a first region of a road surface and emit second light toward a second region that is located directly below the vehicle on the road surface and is different from the first region; a sensor disposed in the vehicle to detect the second light regularly reflected in the second region; and a controller configured to control the light source to set at least one of an intensity or a spectrum of the first light or an image projected by the first light based on a detection result of the sensor.

According to one or more embodiments of the present disclosure, an automobile with improved safety can be provided.

BRIEF DESCRIPTION OF THE DRAWINGS

A more complete appreciation of embodiments of the present disclosure and many of the attendant advantages thereof will be readily obtained by reference to the following detailed description when considered in connection with the accompanying drawings.

DETAILED DESCRIPTION

Description of Embodiments

Each embodiment will be described below with reference to the drawings. It is noted that the drawings are schematic or conceptual and are appropriately simplified or emphasized. For example, the positional relationship, the size ratio, and the like of components are not necessarily the same as the actual ones. In addition, even in a case in which the same portion is represented, the dimensional ratio or the positional relationship may be represented differently depending on the drawings. The same reference signs are used for equivalent elements throughout the present specification and drawings, and the detailed description thereof is not given as appropriate.

First Embodiment

Figure 1:
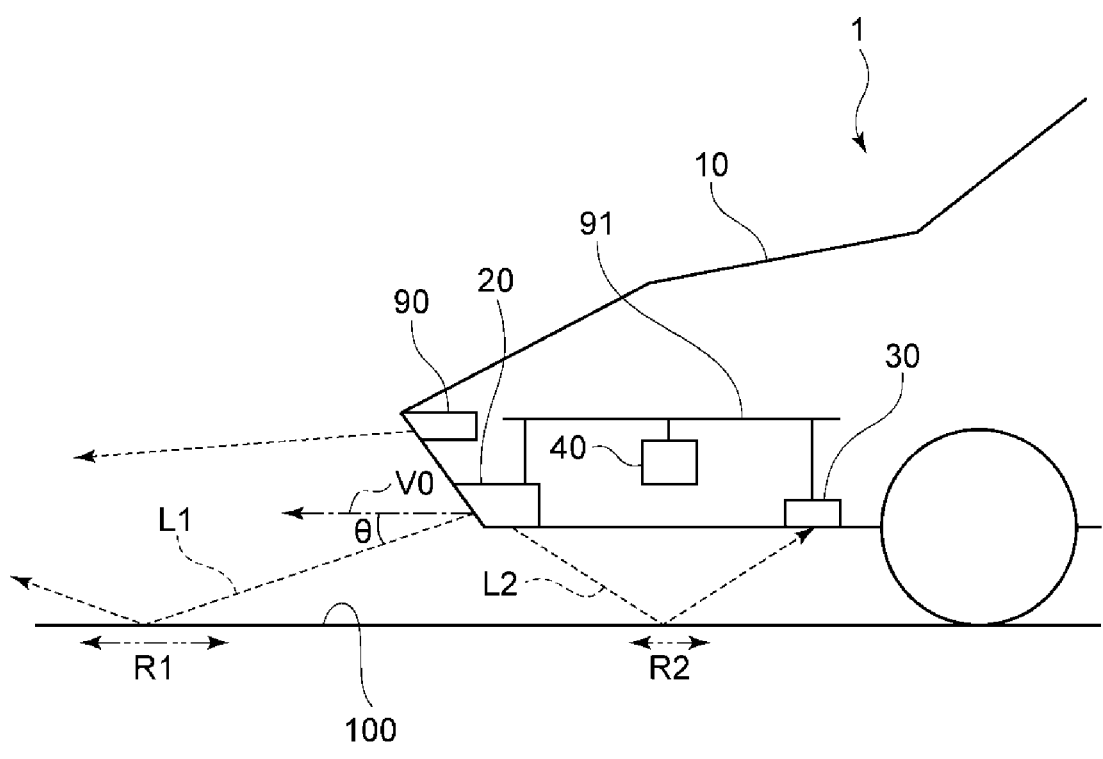
FIG. 1 schematically illustrates a side transparent view of an automobile according to a first embodiment.

FIG. 1 schematically illustrates a side transparent view of an automobile according to a first embodiment.

Figure 2:
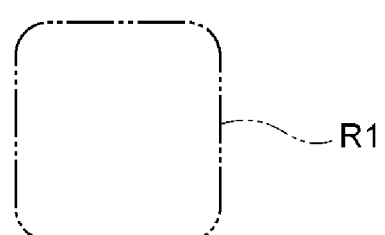
FIG. 2 schematically illustrates a top view of the automobile, a first region, and a second region in the first embodiment.
Figure 2:
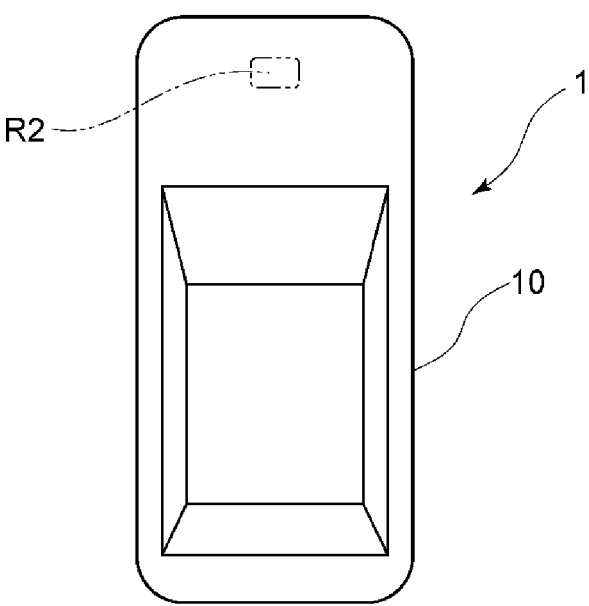

FIG. 2 schematically illustrates a top view of the automobile, a first region, and a second region in the first embodiment.

Figure 3:
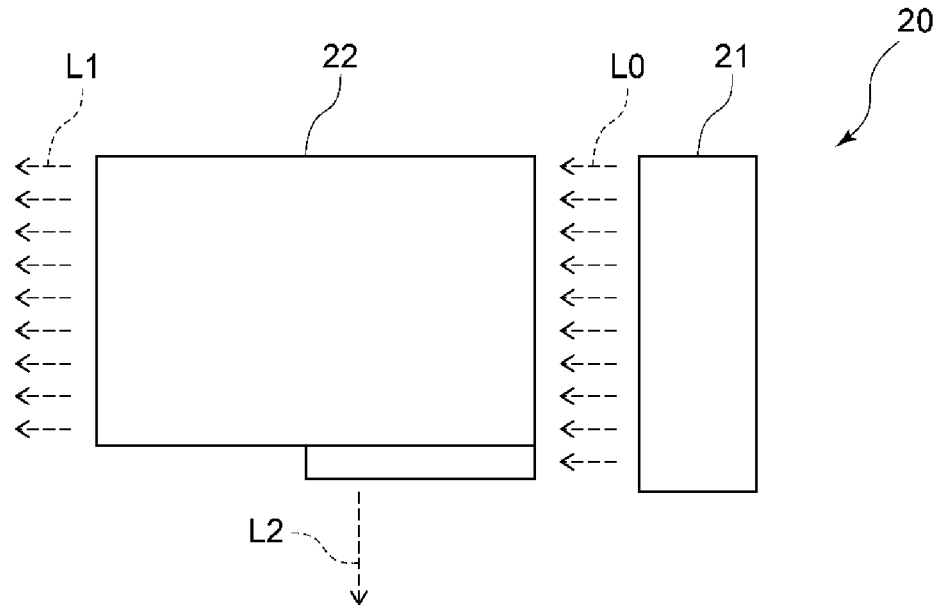
FIG. 3 schematically illustrates a side view of a light source of the automobile according to the first embodiment.

FIG. 3 schematically illustrates a side view of a light source of the automobile according to the first embodiment.

Figure 4A:
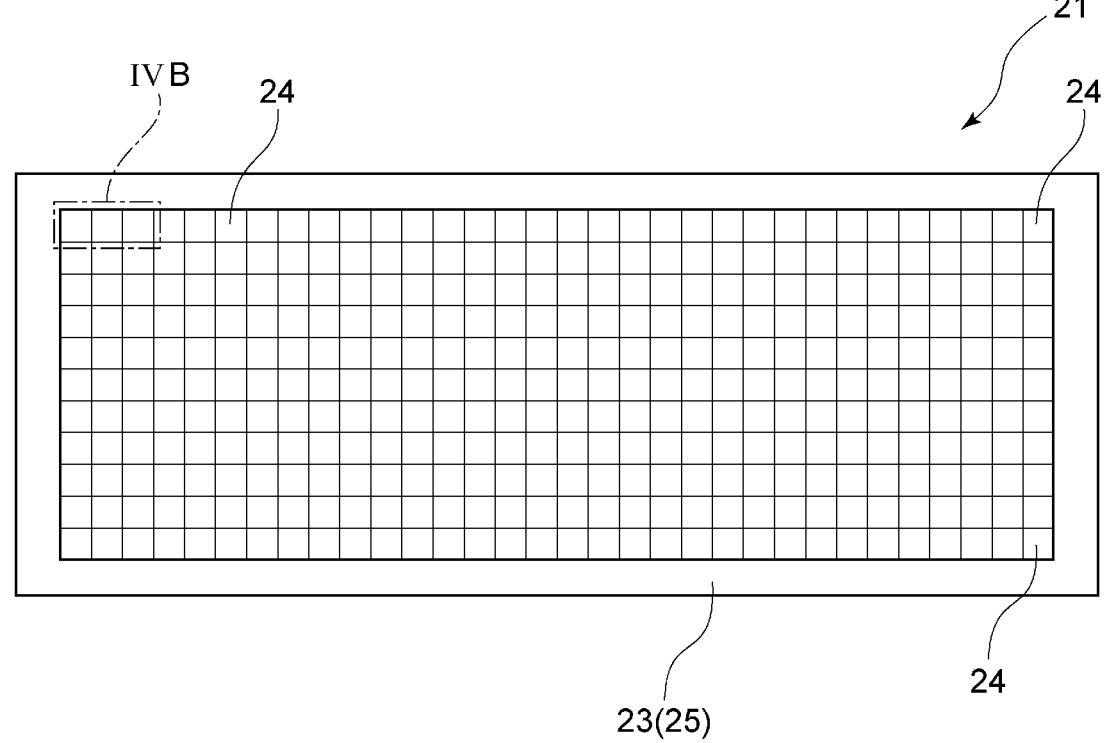
FIG. 4A schematically illustrates a plan view of a light-emitting device of the automobile according to the first embodiment.

FIG. 4A schematically illustrates a plan view of a light-emitting device of the automobile according to the first embodiment.

Figure 4B:
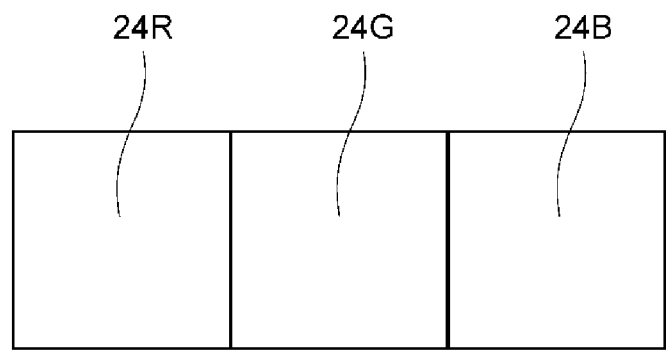
FIG. 4B schematically illustrates an enlarged plan view of a region IVB illustrated in FIG. 4A.

FIG. 4B schematically illustrates an enlarged plan view of a region IVB illustrated in FIG. 4A.

As illustrated in FIGS. 1 and 2, an automobile 1 according to the present embodiment includes a vehicle 10, a light source 20, a sensor 30, and a controller 40. The light source 20 is disposed in the vehicle 10, emits first light L1 toward a first region R1 of a road surface 100, and emits second light L2 toward a second region R2 of the road surface 100. The first region R1 is located in front of the vehicle 10 on the road surface 100. The second region R2 is a region different from the first region R1, and is located directly below the vehicle 10. The sensor 30 is disposed in the vehicle 10 and detects the second light L2 regularly reflected in the second region R2. The controller 40 controls the first light L1 based on a detection result of the sensor 30.

The automobile 1 further includes a headlight 90. The headlight 90 is a normal headlight disposed in the vehicle 10, and emits a low beam and a high beam. The light source of the headlight 90 is, for example, a light-emitting diode (LED). The direction in which the light source 20 emits the first light L1 is inclined downward by an angle θ with respect to a traveling direction V0 of the vehicle 10. The traveling direction V0 of the vehicle 10 is a direction parallel to the road surface 100.

As illustrated in FIG. 3, the light source 20 includes a light-emitting device 21 and an optical system 22. The optical system 22 divides light L0 emitted from the light-emitting device 21 into the first light L1 and the second light L2. That is, the optical system 22 causes part of the incident light L0 to exit as the second light L2 toward the second region R2, and causes the remaining light to exit as the first light L1 toward the first region R1. Preferably, the spectrum of the second light L2 is substantially the same as the spectrum of the first light L1. The second light L2 may be weaker than the first light L1.

As illustrated in FIG. 4A, the light-emitting device 21 includes a substrate 23 and a plurality of light-emitting elements 24. The plurality of light-emitting elements 24 are mounted on the substrate 23 and arranged in a matrix. A control circuit 25 is formed in the substrate 23. The plurality of light-emitting elements 24 are connected to the control circuit 25, and can be independently controlled by the control circuit 25. The light-emitting elements 24 are, for example, LEDs.

As illustrated in FIG. 4B, the plurality of light-emitting elements 24 may include a first light-emitting element 24R that emits light of a first color and a second light-emitting element 24G that emits light of a second color different from the first color. The plurality of light-emitting elements 24 may include, for example, a third light-emitting element 24B that emits light of a third color different from the first color and the second color. For example, the first color is red, the second color is green, and the third color is blue. It is noted that all of the light-emitting elements 24 may emit light of the same color, or the light-emitting elements 24 may emit light of four or more colors. The light emitted from the plurality of light-emitting elements 24 may be wavelength-converted by a wavelength conversion member such as a phosphor sheet or phosphor glass.

As illustrated in FIG. 1, the sensor 30 is disposed at a position where the second light L2 regularly reflected in the second region R2 can be incident, and is disposed, for example, on the lower surface of the vehicle 10. The sensor 30 is, for example, a photodiode or an image sensor.

The controller 40 is configured with, for example, an electronic control unit (ECU) of the automobile 1. The controller 40 may be configured separately from the ECU. The light source 20, the sensor 30, and the controller 40 are electrically connected to each other. The light source 20, the sensor 30, and the controller 40 may be connected to each other, for example, via a vehicle signal BUS 91 of the automobile 1.

Although the headlight 90 is provided on each of the left and right sides of the front portion of the vehicle 10, only one light source 20 may be provided in the vehicle 10, or three or more light sources 20 may be provided in the vehicle 10. In any case, as will be described below, the first region R1 is at a position on the road surface 100 at which the regularly reflected light of the first light L1 reaches a driver's seat of an oncoming vehicle, pedestrians, or the like.

Subsequently, the operation of the automobile according to the present embodiment will be described.

Figure 5:
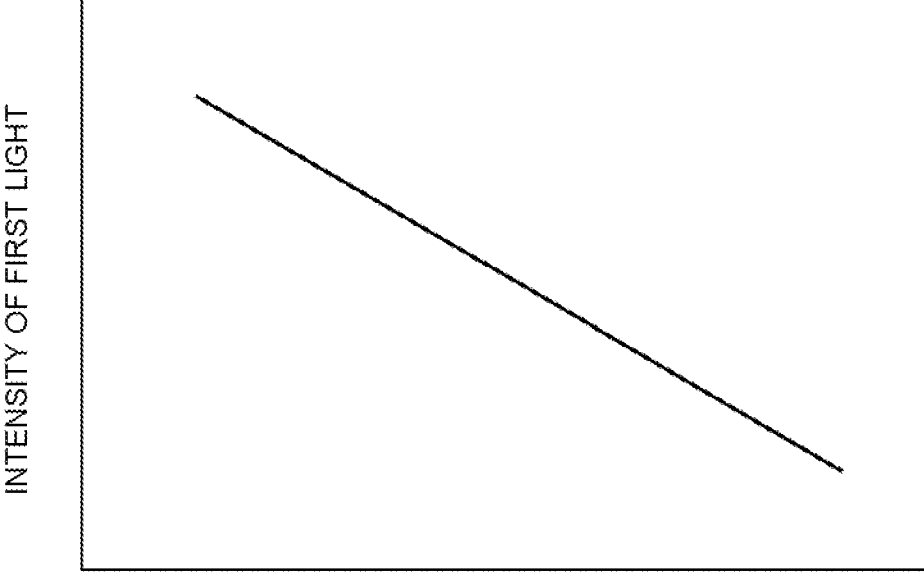
FIG. 5 is a graph to explain a manner of operation performed by a controller with an intensity of second light detected by a sensor on a horizontal axis and an intensity of first light on a vertical axis.

FIG. 5 is a graph to explain a manner of operation performed by a controller with an intensity of second light detected by a sensor on a horizontal axis and an intensity of first light on a vertical axis.

Figure 6A:
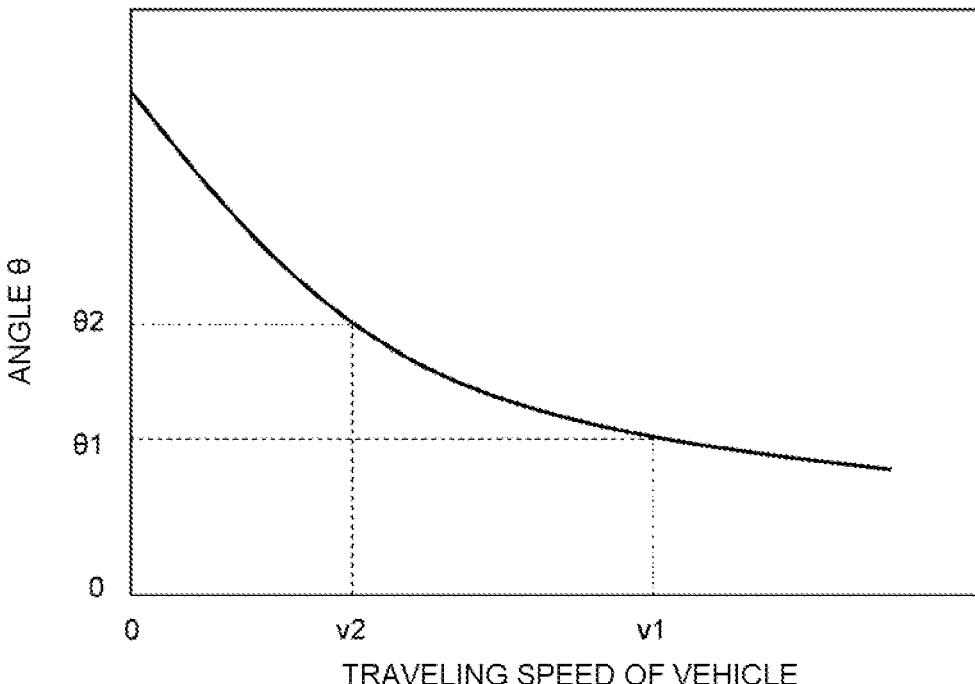
FIG. 6A is a graph to explain a manner of operation performed by the controller with a traveling speed of the vehicle on the horizontal axis and an angle of an emission direction of the first light on the vertical axis.

FIG. 6A is a graph to explain a manner of operation performed by the controller with a traveling speed of the vehicle on the horizontal axis and an angle of an emission direction of the first light on the vertical axis.

Figure 6B:
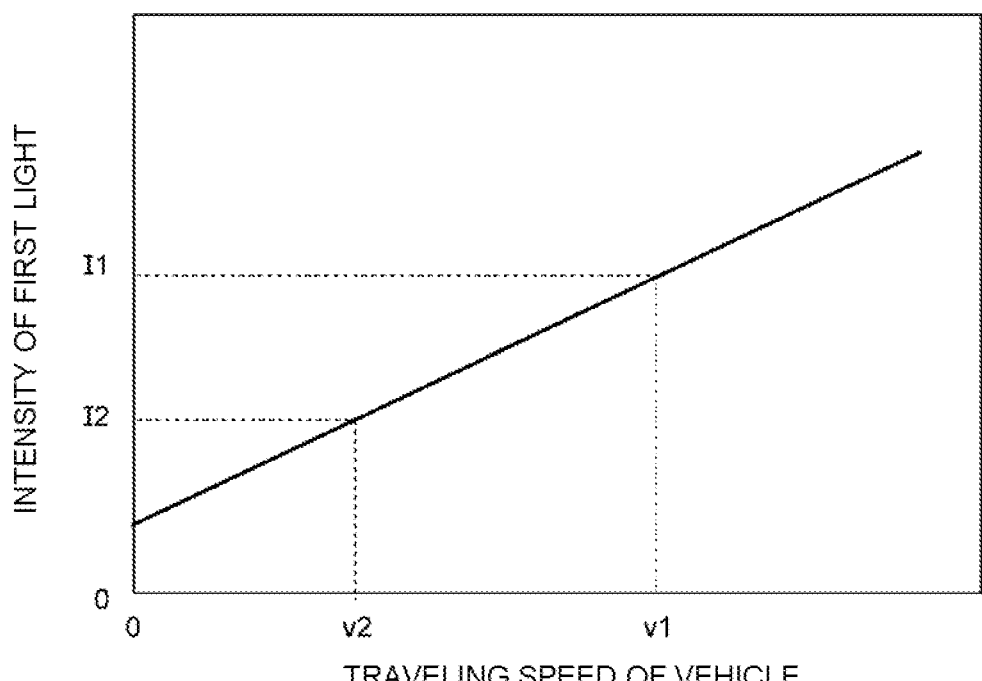
FIG. 6B is a graph to explain a manner of operation performed by the controller with the traveling speed of the vehicle on the horizontal axis and the intensity of the first light on the vertical axis.

FIG. 6B is a graph to explain a manner of operation performed by the controller with the traveling speed of the vehicle on the horizontal axis and the intensity of the first light on the vertical axis.

As illustrated in FIGS. 1 and 2, at least when the automobile 1 travels at night or in a dark place, the headlight 90 is turned on. The headlight 90 illuminates an area in front of the automobile 1 to assist the driver of the automobile 1. Since the headlight 90 is designed such that the light does not reach the driver's seat of the oncoming vehicle, basically, the driver of the oncoming vehicle does not directly visually recognize the light emitted from the headlight 90 of the automobile 1. When the light-emitting surface of the headlight 90 is sufficiently large, the driver of the oncoming vehicle can recognize the presence of the automobile 1 by visually recognizing the light scattered by the cover glass or the like of the headlight 90. However, when the light-emitting surface of the headlight 90 is small, it may be difficult to visually recognize the scattered light.

To address such an issue, in the present embodiment, the light source 20 emits the first light L1 toward the first region R1 of the road surface 100. The first light L1 is regularly reflected in the first region R1 and reaches the driver of the oncoming vehicle in front of the automobile 1. As a result, the first region R1 appears brighter than the surroundings when viewed from the driver of the oncoming vehicle. As a result, the driver of the oncoming vehicle can easily recognize the presence of the automobile 1 even from a distance. The first light L1 emitted from the light source 20 does not directly reach the driver of the oncoming vehicle, but is regularly reflected by the road surface 100 and reaches the driver of the oncoming vehicle. Therefore, the driver of the oncoming vehicle is inhibited from being dazzled by the first light L1.

The first light L1 regularly reflected in the first region R1 also reaches a pedestrian and the like in front of the automobile 1. Thus, the pedestrian or the like can easily recognize the presence of the automobile 1. The light source 20 may emit the first light L1 not only at night but also in the daytime. Thus, the automobile 1 is easily recognized even in the daytime. Hereinafter, in the present disclosure, the illumination of the first region R1 by the first light L1 is also referred to as a "presence illumination".

The color of the presence illumination, that is, the color of the first light L1 is not limited to white, and may be any of various applicable colors. The color of the first light L1 may be, for example, bright yellow, or may be a color having a wavelength with high visibility in the vicinity of 555 nm. Thus, visibility from the oncoming vehicle is improved.

However, the reflectance for the first light L1 of the road surface 100 varies depending on the condition of the road surface 100. For example, the reflectance of a paved road is different from the reflectance of an unpaved road. If the road surface 100 is a paved road, the reflectance is generally higher when the road surface 100 is wet than when the road surface 100 is dry. In addition, when there is snow on the road surface 100, the reflectance is likely to increase. For that reason, even when the light source 20 emits the first light L1 at a constant intensity, the brightness of the first region R1 as viewed from the driver of the oncoming vehicle is not stable. When the first region R1 is too dark, it is difficult for the driver of the oncoming vehicle to recognize the automobile 1. On the other hand, if the first region R1 is too bright, the driver of the oncoming vehicle may be dazzled. Therefore, it is preferable that the brightness of the first region R1 as viewed from the driver of the oncoming vehicle is controlled to be within an appropriate range.

In the present embodiment, the light source 20 emits the second light L2 toward the second region R2, the sensor 30 detects the second light L2 regularly reflected by the second region R2, and the controller 40 feeds back the detection result to the light source 20 to control the intensity of the first light L1, whereby the brightness of the first region R1 as viewed from the driver of the oncoming vehicle can be stabilized.

To be more specific, as illustrated in FIG. 5, the controller 40 weakens the first light L1 as the detected intensity of the second light L2 detected by the sensor 30 increases. For example, when the road surface 100 is a dry paved road and the light reflectance is low, the reflected light of the second light L2 detected by the sensor 30 is weak. In this case, the controller 40 controls the light source 20 to increase the intensity of the first light L1. On the other hand, when the road surface 100 is a wet paved road and the light reflectance is high, the reflected light of the second light L2 detected by the sensor 30 is strong. In this case, the controller 40 controls the light source 20 to weaken the first light L1. In this manner, it is possible to stabilize the brightness of the first region R1 as viewed from the driver of the oncoming vehicle.

Further, the sensor 30 may detect the spectrum of the second light L2 reflected by the second region R2. The controller 40 may detect the reflection characteristics of the road surface 100 by comparing the spectrum of the second light L2 emitted from the light source 20 with the spectrum of the reflected second light L2 detected by the sensor 30, and based on the detection result control the intensity and emission spectrum of the first light L1. For example, in a case in which the road surface is wet with rain and a case in which the road surface is covered with snow, even if the reflectance of the road surface is the same, the spectrum of reflection is different. The controller 40, based on the reflection characteristics of the road surface 100, controls the emission spectrum of the first light L1. Accordingly, it is possible to stabilize the color of the first region R1 viewed from the driver of the oncoming vehicle.

The distance to the oncoming vehicle at which the presence of the automobile 1 is to be recognized depends on the traveling speed of the automobile 1. It is preferable to make the driver of the oncoming vehicle farther away recognize the automobile 1 during high-speed traveling than during low-speed traveling. In addition, since it is more difficult for the first light L1 to reach the oncoming vehicle as the oncoming vehicle is farther away, it is preferable to strengthen the first light L1. In the present embodiment, the controller 40 controls the emission direction and the intensity of the first light L1 based on the traveling speed of the automobile 1.

As illustrated in FIG. 6A, the controller 40 controls the optical system 22 of the light source 20 to decrease the angle θ as the traveling speed of the vehicle 10 increases. As described above, the angle θ is a downward angle between the emission direction of the first light L1 and the traveling direction V0 of the vehicle 10. Therefore, as the angle θ increases, the emission direction of the first light L1 is directed downward, and the first region R1 becomes closer to the vehicle 10. On the other hand, as the angle θ decreases, the emission direction of the first light L1 becomes closer to the traveling direction V0 of the vehicle 10, that is, the direction parallel to the road surface 100, and the first region R1 becomes farther from the vehicle 10. As a result, the higher the traveling speed of the vehicle 10 is, the more likely it is that the oncoming vehicle at a distance will recognize the presence of the automobile 1.

That is, the controller 40 sets an angle θ1 when the traveling speed of the vehicle 10 is a first speed v1 to be smaller than an angle θ2 when the traveling speed of the vehicle 10 is a second speed v2 lower than the first speed v1. As a result, a position of the first region R1 at the first speed v1 is set ahead of a position of the first region R1 at the second speed v2.

Further, as illustrated in FIG. 6B, the controller 40 controls the light source 20 to increase the intensity of the first light L1 as the traveling speed of the vehicle 10 increases. That is, an intensity I1 of the first light L1 when the traveling speed of the vehicle 10 is the first speed v1 is made higher than an intensity I2 of the first light L1 when the traveling speed of the vehicle 10 is the second speed v2. As a result, the first light L1 can reach, with sufficient intensity, a distant oncoming vehicle.

Further, the automobile 1 may include a situation sensor that detects a situation in front of the vehicle 10. As such a situation sensor, for example, a camera or a light detection and ranging (LiDAR) can be used. The controller 40 may detect other vehicles or pedestrians in front of the vehicle 10 based on the detection result of the situation sensor, and feed back the detection result as auxiliary data to the light source 20 to adjust the intensity and spectrum of the first light L1. For example, in accordance with the distance to the oncoming vehicle, the position and the brightness of the first region R1 may be adjusted by controlling the angle θ and the intensity of the first light L1. Further, when there is no oncoming vehicle, the first light L1 and the second light L2 may be turned off. In addition, the intensity and spectrum of the first light L1 may be adjusted according to the surrounding brightness, weather conditions, topography, or the like as auxiliary data.

Subsequently, an advantage of the present embodiment will be described.

In the present embodiment, the light source 20 emits the first light L1 toward the first region R1, so that the first light L1 regularly reflected in the first region R1 reaches the oncoming vehicle. Thus, the driver of the oncoming vehicle can easily recognize the presence of the automobile 1 even from a position that the light emitted from the headlight does not directly reach. As a result, an automobile with improved safety can be provided.

Further, in the present embodiment, the light source 20 emits the second light L2 toward the second region R2, and the sensor 30 detects the second light L2 regularly reflected in the second region R2. Then, the controller 40 weakens the first light L1 as the reflected light of the second light L2 detected by the sensor 30 is stronger. Thus, it is possible to stabilize the brightness of the first region R1 as viewed from the driver of the oncoming vehicle.

Further, in the present embodiment, as the traveling speed of the automobile 1 is higher, the first region R1 is set more ahead of the automobile 1, and the intensity of the first light L1 is increased. Thus, as the traveling speed of the automobile 1 is higher, the first light L1 can reach the oncoming vehicle farther away with an appropriate intensity.

Second Embodiment

A second embodiment is an example in which a light source for the presence illumination and a light source for a sensor are provided separately.

Figure 7:
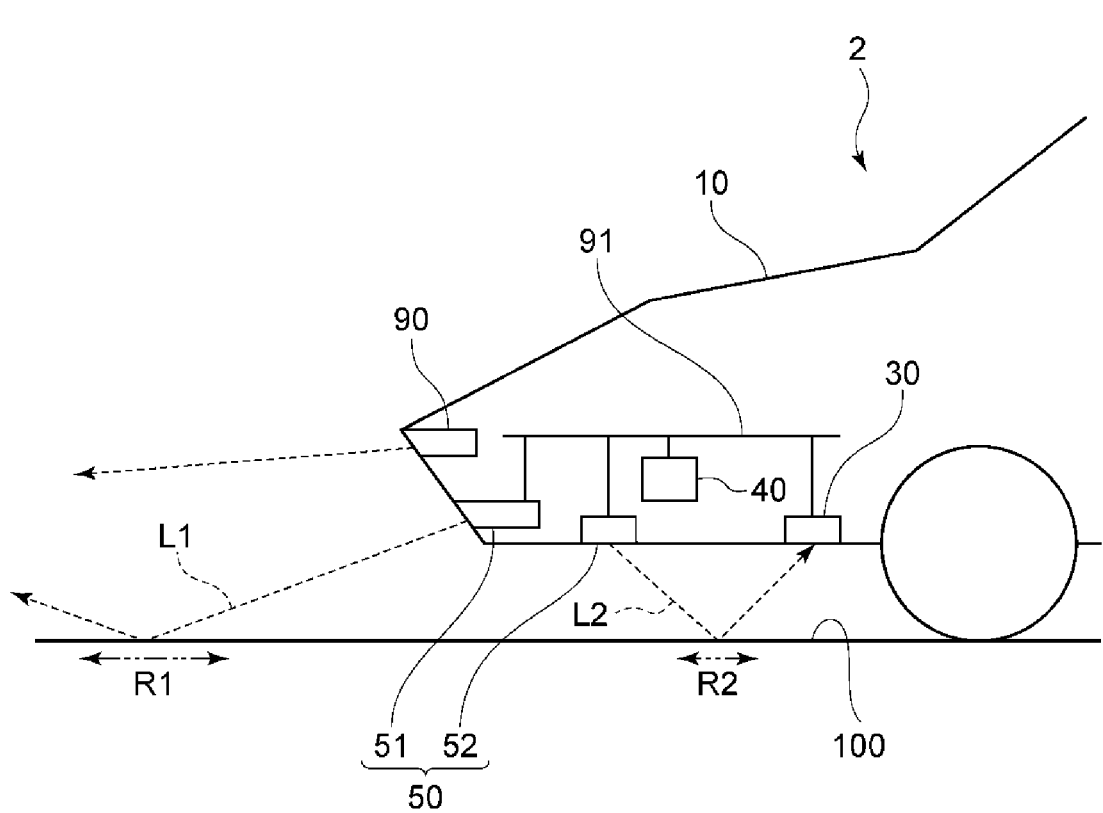
FIG. 7 schematically illustrates a side transparent view of an automobile according to a second embodiment.

FIG. 7 schematically illustrates a side transparent view of an automobile according to the second embodiment.

As illustrated in FIG. 7, an automobile 2 according to the present embodiment is different from the automobile 1 according to the first embodiment in that a light source 50 is provided instead of the light source 20. The light source 50 includes a first light-emitting device 51 that emits the first light L1 and a second light-emitting device unit 52 that emits the second light L2. The first light-emitting device 51 and the second light-emitting device 52 are separate devices. The first light light-emitting device 51 is disposed on the front surface of the vehicle 10, and the second light light-emitting device 52 is disposed on the lower surface of the vehicle 10. The first light-emitting device 51 and the second light-emitting device 52 are connected to the controller 40 via the vehicle signal BUS 91.

According to the present embodiment, since the first light-emitting device 51 and the second light-emitting device 52 are provided as separate devices, each of the light-emitting devices can be miniaturized. Further, each of the light-emitting devices can be disposed at an optimum position. The configuration, operation, and advantages of the present embodiment other than those described above are the same as those of the first embodiment.

Third Embodiment

A third embodiment is an example in which a light source for the presence illumination also serves as a headlight.

Figure 8:
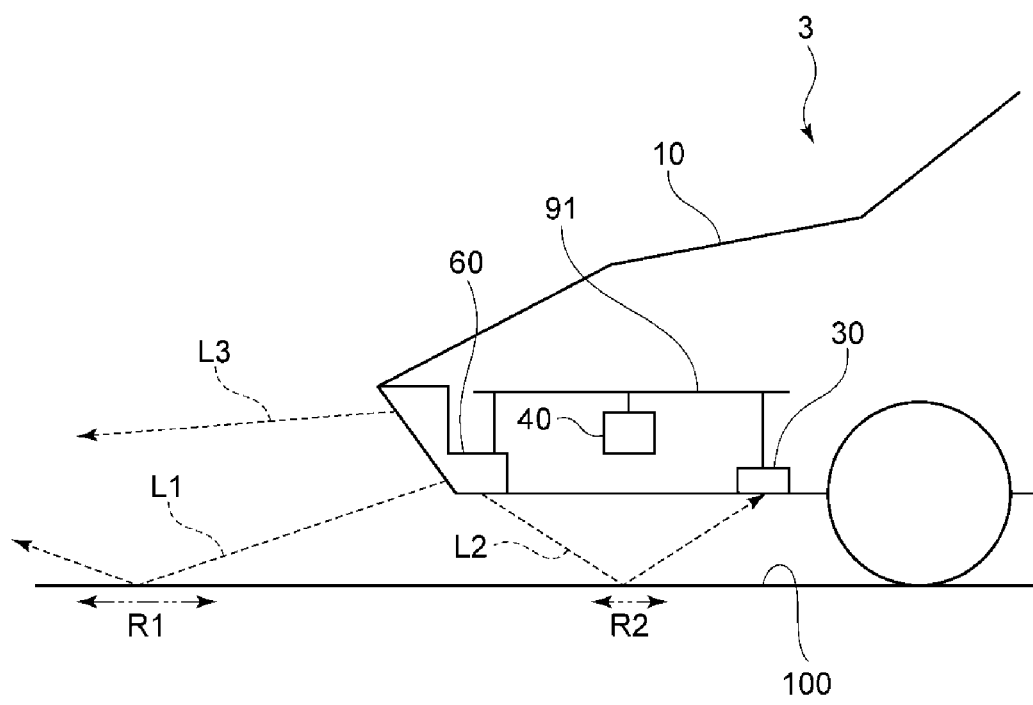
FIG. 8 schematically illustrates a side transparent view of an automobile according to a third embodiment.

FIG. 8 schematically illustrates a side transparent view of an automobile according to the present embodiment.

Figure 9:
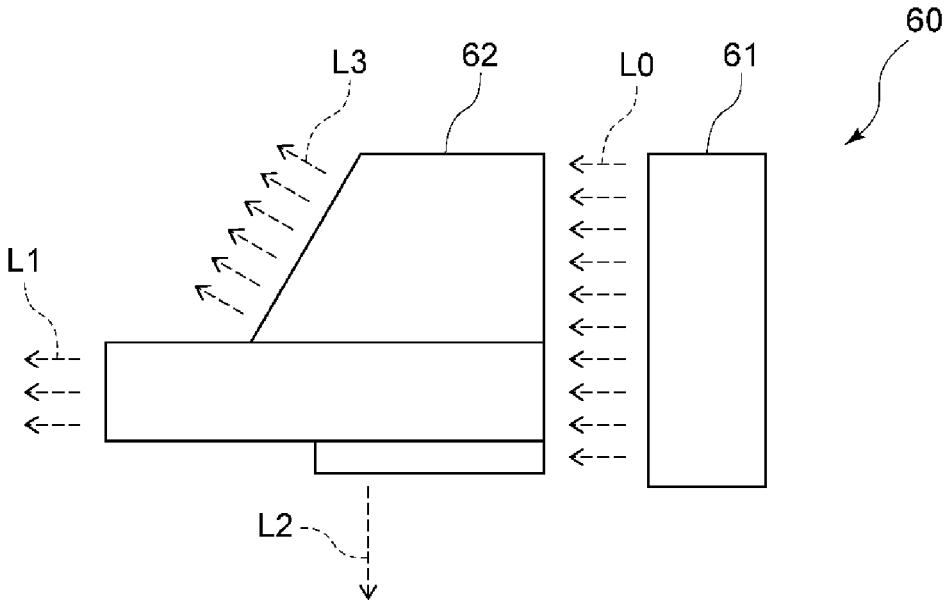
FIG. 9 schematically illustrates a side view of a light source of the automobile according to the third embodiment.

FIG. 9 schematically illustrates a side view of a light source of the automobile according to the present embodiment.

As illustrated in FIG. 8, an automobile 3 according to the present embodiment is different from the automobile 1 according to the first embodiment in that a light source 60 is provided instead of the light source 20 and the headlight 90 is not provided. In addition to the first light L1 and the second light L2, the light source 60 emits third light L3 in the forward direction of the vehicle 10. The third light L3 is light emitted from the headlight of the automobile 3, and includes a low beam and a high beam. Since the light source 60 also serves as a headlight, the light source 60 is provided on each of the left and right sides of the vehicle 10.

As illustrated in FIG. 9, the light source 60 includes a light-emitting device 61 and an optical system 62. The optical system 62 divides the light L0 emitted from the light-emitting device 61 into the first light L1, the second light L2, and the third light L3. That is, the optical system 62 causes part of the incident light L0 to exit toward the second region R2 as the second light L2, causes another part to exit toward the first region R1 as the first light L1, and causes the remaining part to exit in the front direction of the vehicle 10 as the third light L3.

The configuration of the light-emitting device 61 is the same as the configuration of the light-emitting device 21 in the first embodiment, and the plurality of light-emitting elements 24 can be individually controlled. For example, among the plurality of light-emitting elements 24 illustrated in FIG. 4A, the light-emitting elements 24 disposed in the first row from the bottom may emit light to be the second light L2, the light-emitting elements 24 disposed in the second to fourth rows from the bottom may emit light to be the first light L1, and the light-emitting elements 24 disposed in the fifth to uppermost rows from the bottom may emit light to be the third light L3.

With this configuration, the spectrum of the third light L3 can be controlled independently of the spectra of the first light L1 and the second light L2. For example, the spectrum of the third light L3 is controlled so as to satisfy a requirement for a headlight defined by a law, the spectrum of the first light L1 is controlled so as to increase an effect of the presence illumination, and the spectrum of the second light L2 is the same as the spectrum of the first light L1. For example, the third light L3 is white, and the first light L1 and the second light L2 are yellow or green.

According to the present embodiment, since the light source 60 also serves as the headlight, the cost for the headlight and the like can be reduced. The configuration, operation, and advantages of the present embodiment other than those described above are the same as those of the first embodiment.

Fourth Embodiment

A fourth embodiment is an example of forming a spatial or temporal pattern of an image in the presence illumination by the first light L1 by individually controlling the light-emitting elements of the light source.

The configuration of the automobile according to the present embodiment is the same as that of the first embodiment.

In the present embodiment, the controller 40 controls the luminance of each of the plurality of light-emitting elements 24 via the control circuit 25, whereby an image of an arbitrary pattern is projected onto the first region R1. For example, the light-emitting elements 24 that emit the first light L1 include a plurality of portions having mutually different emission directions and luminances. Thus, each portion of the light-emitting elements 24 forms a sub-region in the first region R1. At this time, the light emitted from a portion of the light-emitting elements 24 toward a first sub-region of the first region R1 may be stronger than the light emitted another portion of the light-emitting elements 24 toward a second sub-region of the first region R1 located between the vehicle 10 and the first sub-region. As a result, the brightness of each sub-region is substantially the same when viewed from the driver of the oncoming vehicle.

Hereinafter, examples of the irradiation pattern of the first light L1 will be described.

Figure 10:
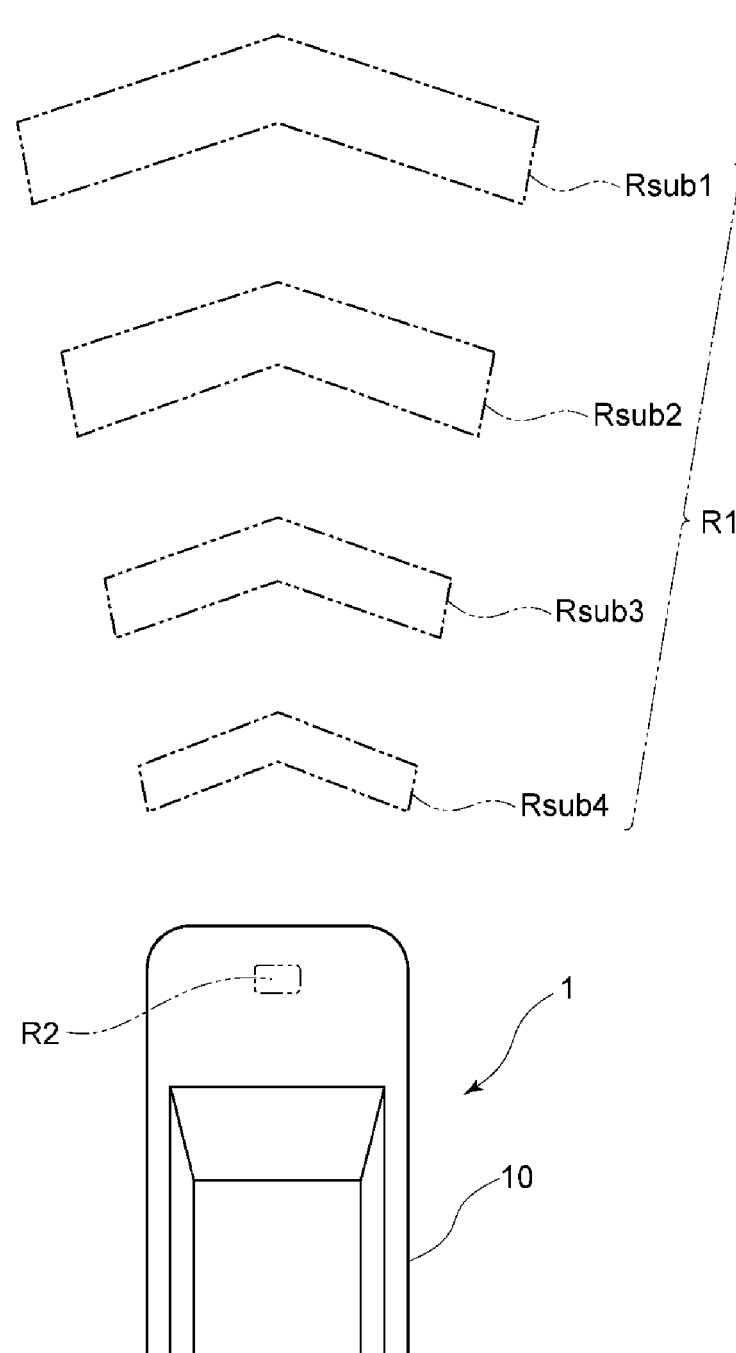
FIG. 10 schematically illustrates a top view of an example of an irradiation pattern of first light in a fourth embodiment.
Figure 11:
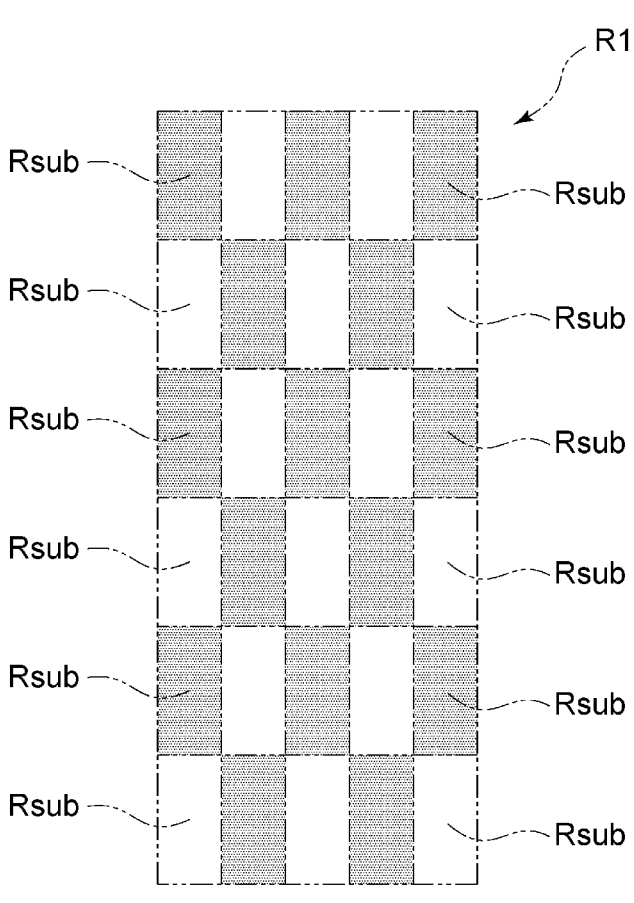
FIG. 11 schematically illustrates a top view of an example of the irradiation pattern of the first light in the fourth embodiment.
Figure 11:
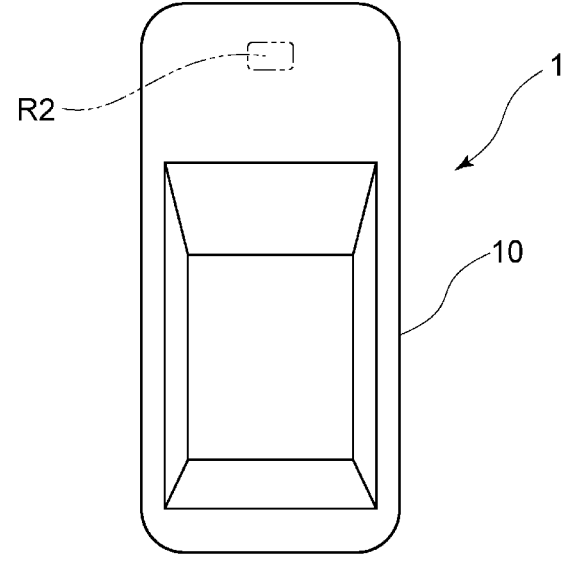

FIGS. 10 and 11 schematically illustrate top views of examples of an irradiation pattern of the first light L1 in the present embodiment.

In the present embodiment, two examples of the irradiation pattern of the first light L1 will be described, but the irradiation pattern is not limited to these examples, and may be any applicable pattern.

First, the example illustrated in FIG. 10 will be described.

In the example illustrated in FIG. 10, the first region R1 is divided into four sub-regions to form a herringbone pattern. The four sub-regions are a first sub-region Rsub1, a second sub-region Rsub2, a third sub-region Rsub3, and a fourth sub-region Rsub4 in order of increasing distance from the vehicle 10.

In the first sub-region Rsub1 farthest from the vehicle 10, the color of the first light L1 is set to a color close to that of the light emitted from the headlight 90, for example, white. Of the four sub-regions Rsub1 to Rsub4, the first sub-region Rsub1 is the brightest and has the largest area. In the fourth sub-region Rsub4 closest to the vehicle 10, the color of the first light L1 is set to a color close to the appearance of the vehicle 10. Among the four sub-regions Rsub1 to Rsub4, the fourth sub-region Rsub4 is the darkest and has the smallest area. This allows the driver of the oncoming vehicle to equate the fourth sub-region Rsub4 with the vehicle 10. The colors, brightnesses, and areas of the second sub-region Rsub2 and the third sub-region Rsub3 are intermediate between those of the first sub-region Rsub1 and the fourth sub-region Rsub4, and gradually vary from the first sub-region Rsub1 to the fourth sub-region Rsub4.

As a result, the driver of the oncoming vehicle first visually recognizes the bright white first sub-region Rsub1 when approaching from a distance, sequentially visually recognizes the second sub-region Rsub2 and the third sub-region Rsub3 as approaching the automobile 1, and finally visually recognizes the fourth sub-region Rsub4 similar to the vehicle 10 in color and width.

At this time, the brightnesses of the sub-regions decrease in a stepwise manner from the first sub-region Rsub1 to the fourth sub-region Rsub4. However, since the oncoming vehicle approaches the automobile 1, the brightnesses of the sub-regions as viewed from the driver of the oncoming vehicle do not vary much. Further, the widths of the sub-regions decrease in a stepwise manner from the first sub-region Rsub1 to the fourth sub-region Rsub4. However, since the oncoming vehicle approaches the automobile 1, the apparent sizes of the sub-regions as viewed from the driver of the oncoming vehicle do not vary much. As a result, when viewed from the driver of the oncoming vehicle, the colors of the sub-regions having substantially the same size and the same brightness appear to gradually change from white to the color of the vehicle 10. In this manner, it is possible to naturally direct the attention of the driver of the oncoming vehicle to the automobile 1.

The intensity and the spectrum of the second light L2 are the same as the intensity and the spectrum of the first light L1 directed to the first sub-region Rsub1, which is the brightest among the plurality of sub-regions. The controller 40 determines the intensity and the spectrum of the first light L1 emitted from a portion of the light-emitting elements 24 toward the first sub-region Rsub1 based on the detection result of the sensor 30. In conjunction with this determination, the controller 40 determines the intensity and the spectrum of light emitted from different portions of the light-emitting elements 24 toward the second sub-region Rsub2, the third sub-region Rsub3, and the fourth sub-region Rsub4.

The first sub-region Rsub1 to the fourth sub-region Rsub4 may be disposed in contact with each other. Thus, a continuous gradation is formed in the first region R1. The pattern of the first region R1 may be changed with time. This allows the pattern to be animated. As a result, the visibility can be further improved. For example, the automobile 1 may include a situation sensor that detects a situation in front of the vehicle 10, and when there is only one oncoming vehicle, the first sub-region Rsub1, the second sub-region Rsub2, the third sub-region Rsub3, and the fourth sub-region Rsub4 may be illuminated in this order in accordance with the distance to the oncoming vehicle. As a result, power consumption can be suppressed.

The shape of each sub-region may be variable in accordance with the shape of the road. For example, it is possible to dynamically control the first region R1 such that it has a shape with good visibility by changing the shape of each sub-region in accordance with a curve, an inclination, or the like of a road.

Subsequently, an example illustrated in FIG. 11 will be described.

In the example illustrated in FIG. 11, the first region R1 is divided into a plurality of rectangular sub-regions Rsub, which are arranged in a matrix. The pattern may be formed by irradiating some, but not all, of the sub-regions Rsub with the first light L1. In FIG. 11, the sub-regions Rsub irradiated with the first light L1 are illustrated with a shading. As illustrated in FIG. 11, a checker pattern can be formed by irradiating every other sub-region Rsub with the first light L1.

Also in the example illustrated in FIG. 11, the brightness of each sub-region Rsub may be changed with time. For example, the visibility of the first region R1 can be improved by causing each sub-region Rsub to blink in accordance with a certain regularity or at random.

According to the present embodiment, various patterns of images can be formed in the first region R1 by dividing the first region R1 into a plurality of sub-regions. In addition, compared with a case in which the entire first region R1 is irradiated with the first light L1 at the same intensity (e.g., intensity of 25), it is possible to improve the peak intensity with the same power consumption. This is because some sub-regions Rsub can be irradiated with a higher intensity (e.g., intensity of 50) whereas some other sub-regions Rsub are not irradiated or irradiated with a lower intensity (e.g., intensity of 5). As a result, it is possible to improve the visibility of the first region R1. The configuration, operation, and advantages of the present embodiment other than those described above are the same as those of the first embodiment.

Fifth Embodiment

A fifth embodiment is an example in which a presence illumination is also used for alerting the driver of their own vehicle.

The configuration of the automobile 1 according to the present embodiment is the same as that of the first embodiment.

Each of FIGS. 12 to 14C schematically illustrates a top view of an example of the irradiation pattern of an image projected with the first light in the present embodiment.

Figure 14A:
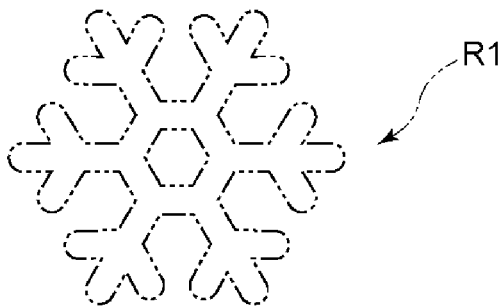
FIG. 14A schematically illustrates a top view of another example of the irradiation pattern of the first light in the fifth embodiment.
Figure 14B:
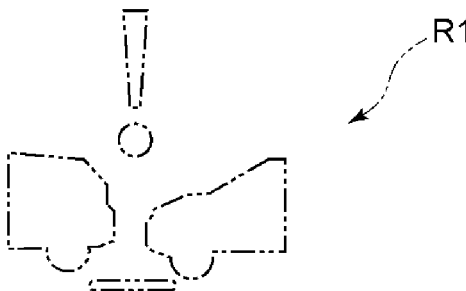
FIG. 14B schematically illustrates a top view of another example of the irradiation pattern of the first light in the fifth embodiment.
Figure 14C:
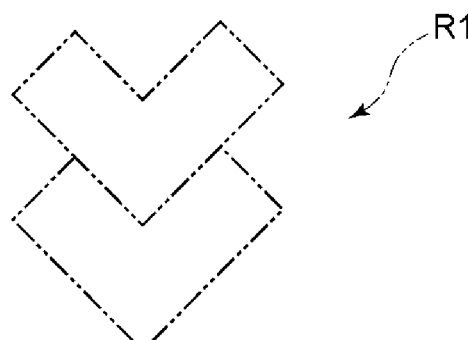
FIG. 14C schematically illustrates a top view of another example of the irradiation pattern of the first light in the fifth embodiment.

In FIGS. 14A to 14C, the vehicle 10 is omitted, and only the first region R1 is illustrated.

Figure 12:
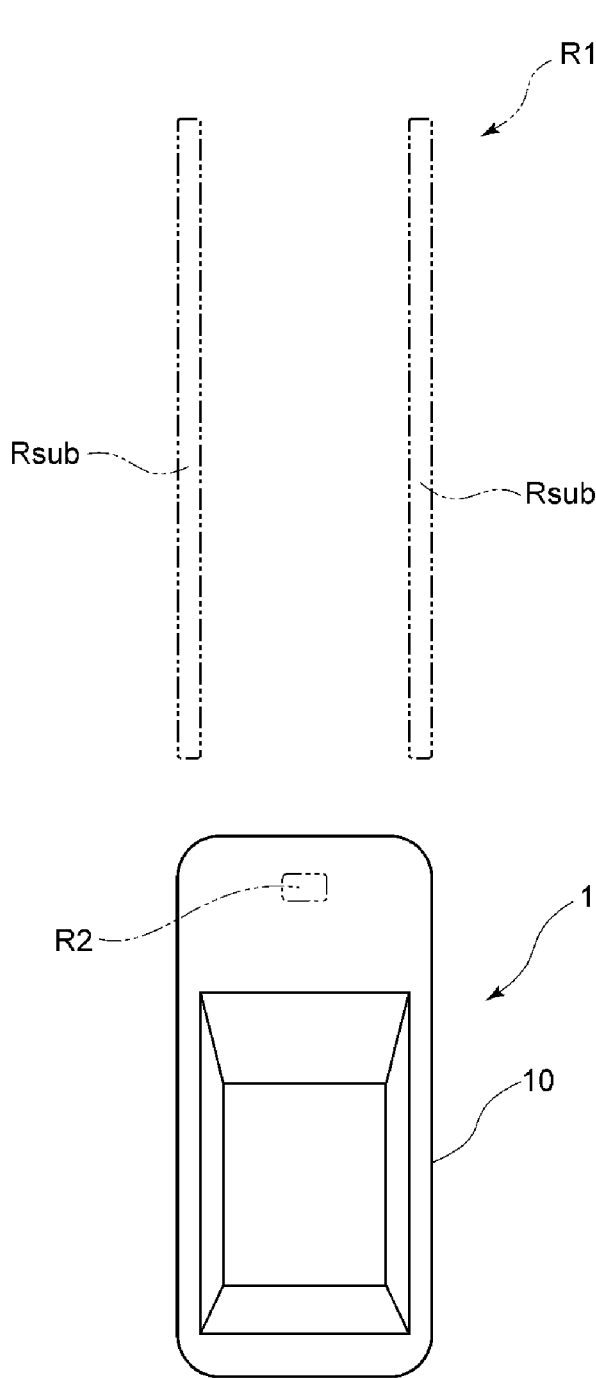
FIG. 12 schematically illustrates a top view of an example of an irradiation pattern of first light in a fifth embodiment.

In the example illustrated in FIG. 12, the first region R1 is divided into two linear sub-regions Rsub, indicating the width of the vehicle 10. Thus, the driver of the automobile 1 can recognize the vehicle width of their own vehicle.

Figure 13A:
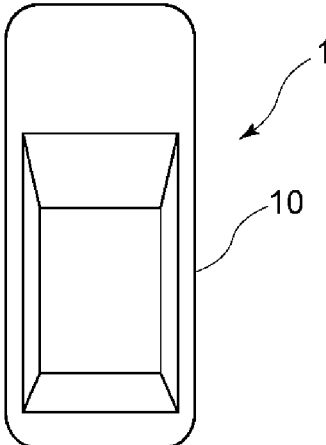
FIG. 13A schematically illustrates a top view of another example of the irradiation pattern of the first light in the fifth embodiment.

In the example illustrated in FIG. 13A, when the automobile 1 deviates to the left side of the lane, the first region R1 having a shape like an arrow directed to the right side is projected to the front left side of the vehicle 10, as the "lane keeping assist warning".

Figure 13B:
FIG. 13B schematically illustrates a top view of another example of the irradiation pattern of the first light in the fifth embodiment.
Figure 13B:
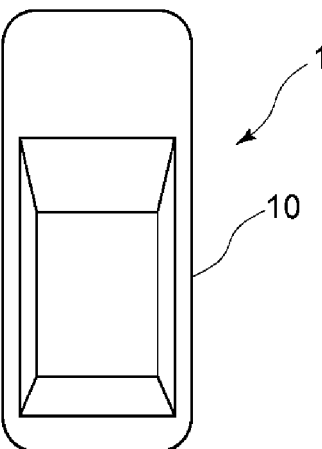

In the example illustrated in FIG. 13B, when the automobile 1 deviates to the right side of the lane, the first region R1 having a shape like an arrow directed to the left side is projected to the front right side of the vehicle 10, as the "lane keeping assist warning".

Based on a detection result of a situation sensor, such as a camera, that detects a situation outside the vehicle, the detection result may be fed back to the light source as auxiliary data to display an alert image for the driver of their own vehicle.

In the example illustrated in FIG. 14A, when the road surface is frozen, the first region R1 having a shape representing a snow crystal is projected in front of the vehicle 10, as a "road surface freezing warning".

In the example illustrated in FIG. 14B, when there is a possibility of collision with the preceding car, the first region R1 having a shape indicating "collision risk warning" is projected in front of the vehicle 10.

In the example illustrated in FIG. 14C, when the automobile 1 is traveling in the wrong direction, the first region R1 having a shape indicating "wrong-way travel warning" is projected in front of the vehicle 10.

In the present embodiment, the first region R1 illustrated in FIGS. 12 to 14C may be used as the presence illumination for the oncoming vehicle, or a region serving as the presence illumination for the oncoming vehicle may be illuminated separately from the first region R1 illustrated in FIGS. 12 to 14C.

According to the present embodiment, it is possible to assist the driver of the automobile 1 by projecting an image having any of various shapes on the first region R1 in front of the vehicle 10 on the road surface 100. The configuration, operation, and advantages of the present embodiment other than those described above are the same as those of the first embodiment.

Sixth Embodiment

A sixth embodiment is an example in which an obstacle under the vehicle is detected mainly at the time of starting the automobile.

Figure 15:
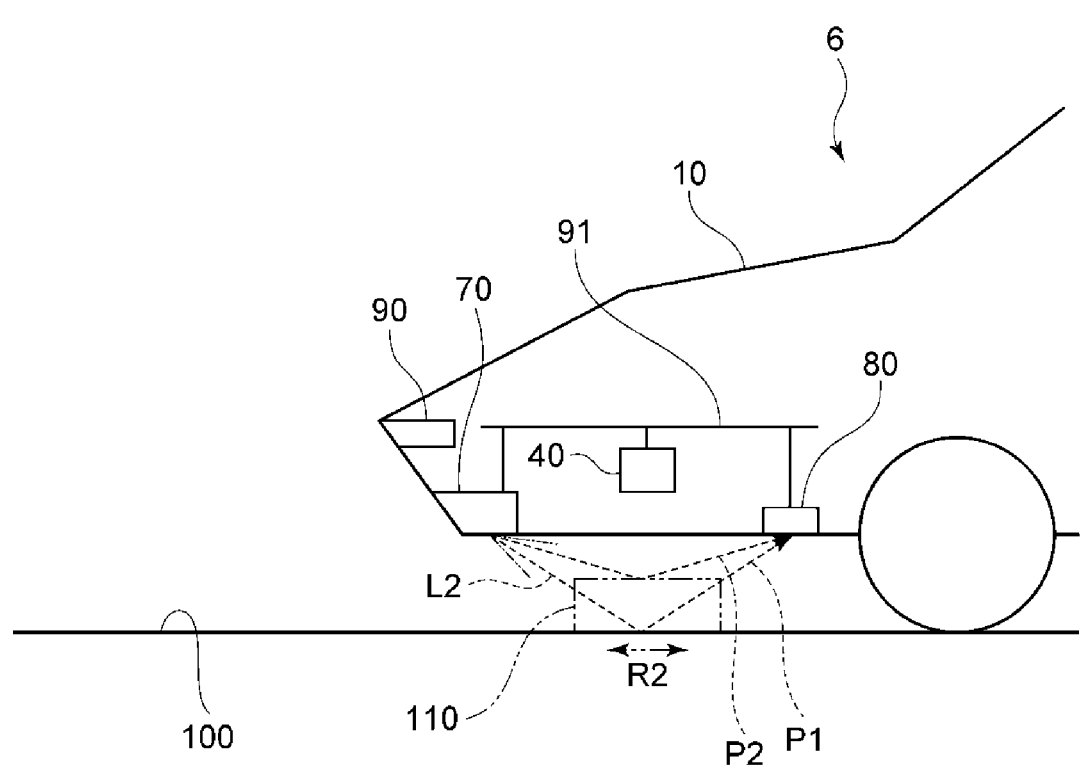
FIG. 15 schematically illustrates a side transparent view of an automobile according to a sixth embodiment.

FIG. 15 schematically illustrates a side transparent view of an automobile according to the present embodiment.

As illustrated in FIG. 15, an automobile 6 according to the present embodiment is different from the automobile 1 according to the first embodiment in that a light source 70 is provided instead of the light source 20 and a sensor 80 is provided instead of the sensor 30. The light source 70 emits the second light L2 in a wider angular range than the light source 20 in the first embodiment. When the reflected light of the second light L2 is detected, the sensor 80 measures the path length of the second light L2 from the light source 70 to the sensor 80, in addition to the intensity and the emission spectrum.

When there is no obstacle under the vehicle 10, the second light L2 emitted from the light source 70 is reflected by the second region R2 of the road surface 100 and enters the sensor 80. The length of a path P1 of the second light L2 from the light source 70 to the sensor 80 at this time is calculated at the design stage of the automobile 6.

On the other hand, when an obstacle 110 is present under the vehicle 10, the second light L2 emitted from the light source 70 is reflected by the obstacle 110 and enters the sensor 80. A path P2 of the second light L2 from the light source 70 to the sensor 80 at this time is shorter than the path P1.

The controller 40 stores a reference distance that is set in advance based on the length of the path P1. When the automobile 6 is started, the light source 70 emits the second light L2, and the sensor 80 measures the length of the path of the second light L2 from the light source 70 to the sensor 80. When the measured length of the path is shorter than the stored reference length, the controller 40 projects an alert image with the first light L1. The controller 40 may display the alert image on a display in the driver's seat of the automobile 6.

According to the present embodiment, the attention of the driver of the automobile 6 can be called by projecting the alert image when the obstacle 110 is present under the vehicle 10. Further, when the driver of the automobile 6 who has recognized the alert image gets off the vehicle 10 and visually checks under the vehicle 10, an area under the vehicle 10 is illuminated by the second light L2, so that the driver can easily check under the vehicle 10. Further, in a case in which the obstacle 110 is an animal such as a cat, it is also possible to expect that the animal would voluntarily retreat by being irradiated with the second light L2. The configuration, operation, and advantages of the present embodiment other than those described above are the same as those of the first embodiment.

Seventh Embodiment

A seventh embodiment is an example in which a presence illumination is provided behind a vehicle.

Figure 16:
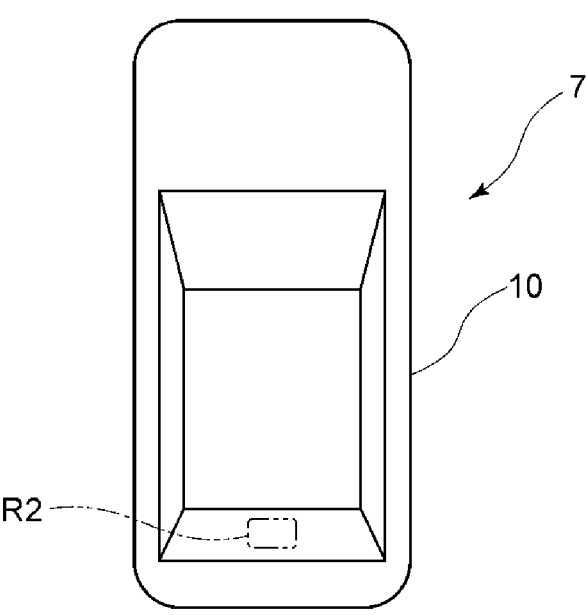
FIG. 16 schematically illustrates a top view of an automobile, a first region, and a second region in a seventh embodiment.
Figure 16:
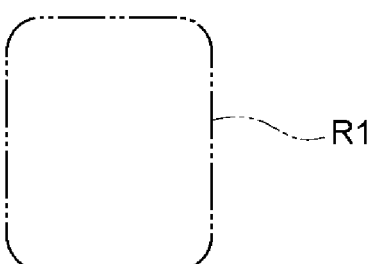

FIG. 16 schematically illustrates a top view of an automobile, a first region, and a second region according to the present embodiment.

As illustrated in FIG. 16, for an automobile 7 according to the present embodiment, the first region R1 irradiated with the first light L1 is positioned behind the vehicle 10 on the road surface 100. This makes it easy for the following vehicle to recognize the presence of the automobile 7. In the present embodiment, as in the first embodiment, the second light L2 is emitted toward the second region R2 directly below the vehicle 10, the sensor 30 detects the second light L2 regularly reflected in the second region R2, and the controller 40 may control the intensity and/or the spectrum of the first light L1 or an image projected with the first light L1 based on the detection result of the sensor 30. It is noted that the relative position of the first region R1 with respect to the vehicle 10 may be controlled by the reverse speed of the vehicle 10, the steering angle, or the like. Further, the visibility of the first region R1 may be improved by coloring or blinking the first light L1.

The first light L1 in the present embodiment may be an alert image to a following vehicle. For example, the alert image is an image indicating a traffic jam ahead, an image calling for attention when a following vehicle is traveling with a high beam, or the like.

According to the present embodiment, it is easy for the following vehicle to recognize the presence of the automobile 7. The configuration, operation, and advantages of the present embodiment other than those described above are the same as those of the first embodiment.

In the present embodiment, the light source that emits the first light L1 and the second light L2 may also be used as a tail lamp of the automobile. Further, the first region R1 may be set in front of and behind the automobile 7. This makes it easy for both the oncoming vehicle and the following vehicle to recognize the presence of the automobile 7.

Each of the aforementioned embodiments is an example embodying the present invention, and the present invention is not limited to these embodiments. For example, in each of the above-described embodiments of the present invention, some components may be added, deleted, or changed. The aforementioned embodiments can be implemented in combination with each other.

The invention claimed is:

1. An automobile comprising:
a vehicle;
a light source disposed in the vehicle and configured to emit first light toward a first region of a road surface and emit second light toward a second region that is located directly below the vehicle on the road surface and is different from the first region;
a sensor disposed in the vehicle to detect the second light regularly reflected in the second region; and
a controller configured to control the light source to set at least one of an intensity or a spectrum of the first light or an image projected with the first light based on a detection result of the sensor, wherein
the light source includes
a control circuit; and
a plurality of light-emitting elements connected to the control circuit, each of the plurality of light-emitting elements being independently controllable by the control circuit,
the first region includes a first subregion and a second subregion that is closer to the vehicle than is the first subregion and separated from the first subregion,
light emitted from a first part of the light-emitting elements is directed to the first subregion and light emitted from a second part of the light-emitting elements is directed to the second subregion, and
a luminance of the first part of the light-emitting elements is different from a luminance of the second part of the light-emitting elements.

2. The automobile according to claim 1, wherein the light source includes:
a first light-emitting device configured to emit the first light; and
a second light-emitting device configured to emit the second light.

3. The automobile according to claim 1, wherein the light source includes:
a light-emitting device; and
an optical system configured to split light emitted from the light-emitting device into the first light and the second light.

4. The automobile according to claim 1, wherein the light source also emits third light in a forward direction of the vehicle.

5. The automobile according to claim 4, wherein a spectrum of the first light is the same as a spectrum of the second light and different from a spectrum of the third light.

6. The automobile according to claim 1, wherein the controller is configured to cause the intensity of the first light to be a first intensity when an intensity of the second light detected by the sensor is a first detected intensity, and to be a second intensity less than the first intensity when the intensity of the second light detected by the sensor is a second detected intensity greater than the first detected intensity.

7. The automobile according to claim 1, wherein the controller is configured to cause the spectrum of the first light to be a first spectrum when a spectrum of the second light detected by the sensor is a first detected spectrum, and cause the spectrum of the first light to be a second spectrum different from the first spectrum when the spectrum of the second light detected by the sensor is a second detected spectrum different from the first detected spectrum.

8. The automobile according to claim 1, wherein the controller is configured to cause the direction of the first light to be a first direction that causes the first region to be at a first position when a traveling speed of the automobile is a first speed, and cause the direction of the first light to be a second direction that causes the first region to be at a second position ahead of the first position in a forward direction of the vehicle when the traveling speed is a second speed greater than the first speed.

9. The automobile according to claim 1, wherein the controller is configured to cause the intensity of the first light to be a first intensity when a traveling speed of the automobile is a first speed, and cause the intensity of the first light to be a second intensity greater than the first intensity when the traveling speed is a second speed greater than the first speed.

10. The automobile according to claim 1, wherein the sensor is a photodiode or an image sensor.

11. The automobile according to claim 1, wherein the first region is in front of the vehicle on the road surface.

12. The automobile according to claim 1, wherein the first region is behind the vehicle on the road surface.

13. The automobile according to claim 1, wherein the plurality of light-emitting elements are LED elements arranged in a matrix.

14. The automobile according to claim 1, wherein the plurality of light-emitting elements include a first light-emitting element configured to emit light of a first color and a second light-emitting element configured to emit light of a second color different from the first color.

15. The automobile according to claim 1, wherein the controller is configured to control the light source to set a luminance of each of the plurality of light-emitting elements to project an image of a certain pattern on the first region.

16. The automobile according to claim 1, wherein
the light emitted from the first part of the light-emitting elements has a strongest intensity among intensities of lights emitted from a plurality of parts of the light-emitting elements, and
an intensity of the second light is the same as the strongest intensity.

17. The automobile according to claim 1, wherein the luminance of the first part of the light-emitting elements is greater than the luminance of the second part of the light-emitting elements.

18. The automobile according to claim 1, wherein the second region always entirely overlaps the vehicle in plan view from above the vehicle.

19. An automobile comprising:
a vehicle;
a light source disposed in the vehicle and configured to emit first light toward a first region of a road surface and emit second light toward a second region that is located directly below the vehicle on the road surface and is different from the first region;

a sensor disposed in the vehicle to detect the second light regularly reflected in the second region; and a controller configured to control the light source to set at least one of an intensity or a spectrum of the first light or an image projected with the first light based on a detection result of the sensor, wherein the sensor is configured to measure a length of a path of the second light from the light source to the sensor when the sensor detects reflected light of the second light, and the controller is configured to cause an alert image to be projected with the first light on the first region when the length of the path is shorter than a reference length set in advance.

20. The automobile according to claim 19, wherein the second region always entirely overlaps the vehicle in plan view from above the vehicle.

\* \* \* \* \*